United States Patent [19]

Shelton

[11] Patent Number: 4,930,832

[45] Date of Patent: Jun. 5, 1990

[54] PUNCTURE AND TEAR RESISTANT ARMORED CONVERTIBLE TOPS FOR AUTOMOBILES

[76] Inventor: Robert Shelton, 898 Wabash Ct., Claremont, Calif. 91711

[21] Appl. No.: 298,161

[22] Filed: Jan. 18, 1989

[51] Int. Cl.$^5$ ............................................. B60J 7/12
[52] U.S. Cl. ..................................... 296/107; 296/136; 428/256; 428/911; 160/DIG. 7; 150/166
[58] Field of Search ............. 296/107, 136; 428/256, 428/911, 916; 160/332, DIG. 1, DIG. 2, DIG. 7, 237; 150/166

[56] References Cited

U.S. PATENT DOCUMENTS

| | | | |
|---|---|---|---|
| 1,163,094 | 12/1915 | Kurek | 428/911 X |
| 1,354,987 | 10/1920 | Miller | 296/107 |
| 1,546,346 | 7/1925 | Mandalian | 428/256 X |
| 1,616,126 | 2/1927 | Jacobson | 296/136 X |
| 2,317,452 | 4/1943 | Goodloe | 428/911 X |
| 2,326,713 | 8/1943 | Wesseler | 296/136 X |
| 2,479,825 | 8/1949 | Fleischhauer | 160/DIG. 2 |
| 2,728,698 | 12/1955 | Rudner | 428/256 |
| 3,284,806 | 11/1966 | Prasser | 2/2.1 R |
| 4,356,569 | 11/1982 | Sullivan | 2/2.5 |
| 4,493,865 | 1/1985 | Kuhlmann et al. | 428/256 X |
| 4,564,539 | 1/1986 | Tsuji | 428/33 |
| 4,678,699 | 7/1987 | Kritchevsky et al. | 428/256 X |

FOREIGN PATENT DOCUMENTS 328982  5/1930  United Kingdom ............... 428/255

Primary Examiner—Dennis H. Pedder
Attorney, Agent, or Firm—Dressler, Goldsmith, Shore, Sutker & Milnamow, Ltd.

[57] ABSTRACT

A composite flexible planar material suitable for an automotive convertible top is made from fabric and chain mail. The chain mail consists of a regular array of interlocking stainless steel rings. An automotive convertible top formed of such composite flexible planar material is highly puncture and tear resistant. If the chain mail is disposed to the exterior then such a convertible top is visually distinctive.

8 Claims, 3 Drawing Sheets

PUNCTURE AND TEAR RESISTANT ARMORED CONVERTIBLE TOPS FOR AUTOMOBILES

BACKGROUND OF THE INVENTION

1. Field of the Invention

The present invention concerns puncture and tear resistant material particularly suitable for use in vehicular convertible tops, and convertible tops constructed with such material.

2. Background of the Invention

Vehicular roofs, or tops, that deploy between an erected position shielding the vehicle's passenger compartment and its occupants, and a retracted position stored in or about the vehicle, have long been popular for permitting the vehicle's passengers to selectively expose or shield themselves from the weather and from view. Erectable and retractable vehicular roofs are deployed by diverse mechanical mechanisms variously involving the mechanical actions of sliding, telescoping, springing into position (e.g., the "hardtop convertible"), and folding.

Almost all erectable roofs for automobiles are constructed as conventional convertible tops made from foldable sheet material (normally weatherproof fabric) and collapsible frames. Conventional convertible tops for automobiles are lightweight, compact when folded, amenable to powered positioning control, and reasonably satisfactory when erected to shield and protect the automobile occupants from weather and noise.

The conventional automotive convertible top has, however, certain limitations. It exhibits only limited resistance to puncture and tearing, whether accidental or malicious. Criminal forced entry into automotive interiors in order to steal items located therein, such as the automobile's radio, is unfortunately very prevalent in some urban areas at the present time. If the automobile has a convertible top then the criminal simply slashes the top with a knife or other tool to gain access to the automobile's doorlocks, and ultimately to the automobile's interior. A conventional convertible top not only presents but scant impediment to forced entry, but is all but unusable in high crime areas because the top will soon be maliciously ruined during forced entry. This is true regardless of whether or not the automobile's interior ever contains anything worth stealing.

Other, more subtle, problems exist with the limited strength of a conventional automotive convertible top. When an automobile is involved in a serious accident then its occupants may be thrown from the passenger compartment, or foreign bodies may penetrate into the passenger compartment, much more readily through an erected convertible top than through a modern steel automotive roof.

A conventional convertible top cannot withstand high aerodynamic forces as well as a steel roof. Even convertible tops of high quality are subject to delamination, tearing, or being ripped from their affixation to the convertible frame and/or the automobile itself when exposed, while erected, to the aerodynamic forces resulting from travel at very high speeds. Destruction of a convertible top due to aerodynamic forces can occur whether or not the automobile's windows are up or down. However, catastrophic failure of an erected convertible top is typically more precipitous, spectacular, and dangerous when the automobile's windows are down. In such a case a convertible top may tear completely away from the automobile within the period of a few seconds. Even when high speeds and high aerodynamic forces sufficient to induce catastrophic failure of a convertible top are never encountered, the aerodynamic forces experienced by an erected convertible top tend over time to stretch the top and loosen its mountings.

Accordingly, it would be desirable if most of the advantages, and the widespread consumer acceptance, of a conventional convertible top could be preserved while somehow strengthening the top against failure from excessive penetration and/or aerodynamic forces.

It is known to provide repositionable and removable roofs for vehicles that, nonetheless to their ability to assume both erected and storage positions, present high strength including resistance to penetration.

U.S. Pat. Ser. No. 1,289,969 for a CANOPY to Tichenor shows a telescoping mesh screen canopy particularly for use on a baby carriage. The screen material of the canopy is not flexible, and is correspondingly not folded. The interior of the baby carriage is vented through the screen canopy. Accordingly, the canopy is not combined with waterproof shielding such as fabric.

U.S. Pat. Ser. No. 2,623,779 for an AUTOMATIC CONVERTIBLE STEEL TOP to Catell shows telescoping steel sections forming a retractable steel roof for an automobile. Although presenting the strength and puncture resistance that is inherent to sheet steel, the retractable steel roof requires a special mechanism to be extended for use and retracted for storage. Although it is called a "top", the deployment and support structure of the retractable steel roof is substantially dissimilar to a normal fabric automotive convertible top.

U.S. Pat. Ser. No. 1,860,463 for an AUTOMOTIVE TOP to Kaplan, et al. again shows an automotive retractable roof made of folding steel plates. The roof is again of substantially unique construction, and is not susceptible of being retrofitted to automobiles using conventional fabric convertible tops.

High-strength repositionable vehicular roofs may in general be both erected and retracted, but are not folded and unfolded along semi-random fold lines in the manner of a conventional, flexible fabric, convertible top. It is desirable that a high-strength vehicular roof should be easily and semi-randomly foldable because erection and retraction are simple and reliable. Furthermore, erection and retraction may be power assisted by relatively simpler mechanisms than those which control the deployment of rigid repositionable automobile roofs.

It is additionally known to make use of steel mesh in automotive roofs, including in wood- and tar-containing roofs as were common upon automobiles during the 1920's and 1930's. The metal screen that was used within such roofs, or sometimes in addition to such roofs, was commonly neither flexible nor convertible. However, it was occasionally removable. U.S. Pat. Ser. No. 1,354,987 for an AUTOMOBILE SCREEN to Miller shows a screen, evidently somewhat flexible, which snaps over the existing roof and windows of an automobile in order to keep out insects. The screen is, however, not convertible in the sense that it may be erected and retracted, folded and unfolded, and stored while still attached to the automobile. The screen of Miller is also not attached to any structural members of the automotive roof.

In an art area that is totally separate and distinct from convertible tops but that is also of relevance to the present invention, flexible armor made from interlinked metal rings or metal pieces, commonly called chain mail, has been known since medieval times. Chain mail has not commonly been used for armor since the battle of Agincourt in 1415 because it may be penetrated by a metal-tipped lance, arrow, or ballistic projectile.

A modern use of chain mail exists, however, in the "shark suit" product of Neptumic, Inc. P.O. Box 7870, San Diego, Calif. 92107. The chain mail used in this product is described in U.S. Pat. Ser. No. 3,284,806 for a PROTECTIVE GARMENT to D. O. Prasser. In use for a "shark suit" a diver dons a soft armor inner garment, preferably made of laminated Kevlar®fibre (trademark of DuPont Company). An outer garment made of chain mail is donned over the top of the soft armor. The chain mail guards against penetration of the teeth of sharks while the soft armor distributes the force of any shark bites over a wider area of the body. Divers have tested the suit against the attacks of common sharks ranging to six feet in length without incurring serious injury. An improved "shark suit" where armored panels are embedded in a chain mail garment worn exteriorly of a wetsuit is described in U.S. Pat. Ser. No. 4,356,569 for an ARMORED SKIN DIVING SUIT to Jeremiah Sullivan.

SUMMARY OF THE INVENTION

The present invention contemplates puncture resistant flexible planar material suitable for use in a vehicular convertible tops, and collapsible vehicular convertible tops formed of such material.

In accordance with the present invention, puncture resistance flexible planar material, and vehicular convertible tops constructed from the material, are made from chain mail. The preferred chain mail is a highly flexible lightweight type made from small, typically ⅛" diameter, interlocking rings. Each such interlocking ring that is not at the borders of the chain mail preferably interlocks four other such rings. Each ring preferably passes two adjacent rings through its central aperture in a one directional sense while the remaining two adjacent rings are passed through its central aperture in the opposite directional sense. The chain mail is typically made from corrosion resistant metal, and more typically from stainless steel. It is characterized by being highly flexible, tactually and visually pleasing, and extremely strong.

In accordance with the present invention, the flexible planar material suitable for an automotive convertible top further includes, in addition to the chain mail, a flexible sheet material, typically fabric. The flexible sheet material may alternatively be made of tough plastic. The fabric is affixed to the chain mail by sewing, by adhesive, or by other known means of affixing multiple layers of flexible material while preserving the flexibility and foldability of such material.

In a preferred embodiment of a vehicular convertible top in accordance with the present invention the chain mail is substantially coextensive with the fabric material. Both the chain mail and the fabric are normally affixed to the support frame of the convertible top. Both move with this frame for erection and retraction of the convertible top. The chain mail is normally disposed toward the interior of the vehicle from the fabric, although this need not invariably be the case.

In use for a vehicular convertible top the chain mail is normally affixed to the fabric at, and only at, locations where the chain mail and fabric are jointly affixed to the struts of the vehicular convertible top support frame. The chain mail is correspondingly somewhat loose to the fabric, with one being affixed to the other only every one to two feet. The chain mail and the fabric may alternatively be more extensively and more frequently affixed together, creating a somewhat firmer and stiffer convertible top.

All affixations are typically by process of sewing. The sewed affixation of the chain mail and the fabric to the struts of the support frame need not be along a continuous seam, but can be accomplished at a series of loop, or tie, points. Likewise, any separate and independent affixation of the chain mail directly to the fabric may also transpire either along sewn seams or at (typically arrayed) points.

Whether interior or exterior to the vehicular convertible top, and whether tightly or loosely affixed to the fabric and/or the support frame of the convertible top, the chain mail accords greatly enhanced strength to the convertible top. It is particularly resistant to such penetration, cutting, or ripping as might attend an illegal forced entry into the vehicle's interior through the convertible top.

The metal chain mail of the convertible top may be made part of an alarm circuit which sounds an alarm upon any forced entry into the vehicle through its convertible top.

DESCRIPTION OF THE PREFERRED EMBODIMENT

The present invention contemplates the combination of chain mail with flexible sheet material, typically weatherproof fabric, in order to form a composite flexible planar material that is both flexible and strong. The composite flexible planar material is particularly suitable for use in the construction of vehicular, typically automotive, convertible tops. In such capacity the composite flexible planar material wears well, folds easily, and exhibits superior strength, especially to malicious damage.

Figure 1:
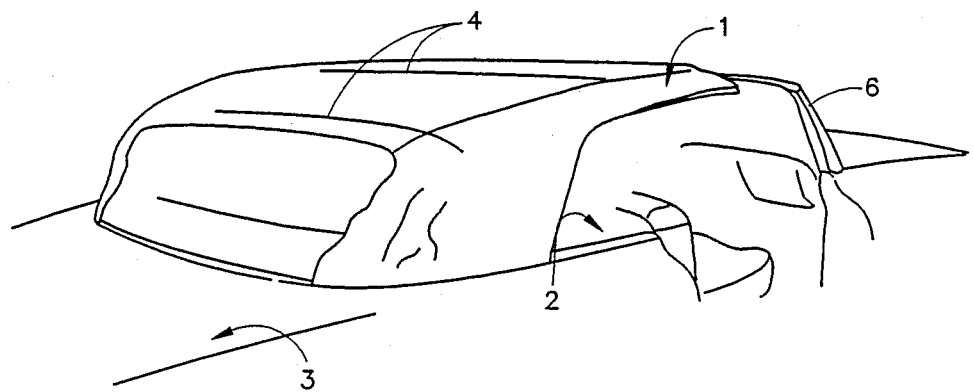
FIG. 1 is a perspective view of a partially erected automotive convertible top constructed in accordance with the present invention.

A preferred embodiment of an automotive convertible top 1 constructed in accordance with the present invention is shown in FIG. 1. The convertible top 1 fits over the passenger compartment 2 of an automobile 3. The convertible top 1 has a frame 4 which includes a number of structural members, or struts, 5. The frame 4 is permanently affixed to the automobile 3 at the rear of passenger compartment 2, and is removably affixed to the windshield 6 of the automotive 3 at the front of passenger compartment 2. The convertible top 1 is illustrated in position midway between its erected position forming a roof to passenger compartment 2 and its storage position within the automobile 3 at the rear of passenger compartment 2.

In accordance with the present invention, the automotive convertible top 1 is preferably constructed of composite flexible planar material 10. This composite flexible planar material 10 is illustrated in perspective view in FIG. 2 and in side view in FIG. 3. It preferably consists of chain mail 11 affixed to a contiguous sheet of flexible sheet material 12. The flexible sheet material 12 is durable and waterproof. It is typically treated fabric or plastic that is suitable for use in an automotive convertible top 1.

Figure 5:
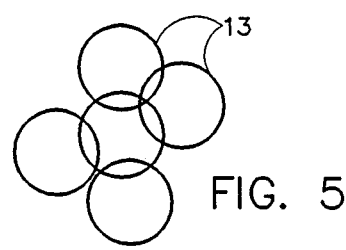
FIG. 5 is a detail plan view of the preferred embodiment of chain mail used in the composite flexible planar material, and in the automotive convertible top, in accordance with the present invention.

The preferred embodiment of the chain mail 11 that is used in formation of the composite flexible planar material 10, and of the automotive convertible top 1, is shown in FIG. 5. The chain mail 11 may be seen to consist of a regular interlocking array of rings 13. Each individual ring 13 is typically ⅛" in diameter. The rings 13 are preferably made from 1/32" diameter polished stainless steel wire. They are assembled into the chain mail 11 by a manual process that welds the butt ends of a loop of stainless steel wire to form a closed circular loop, or ring. Each one of the rings 13 threads the appropriate number of adjacent rings in order to form a continuous sheet material of unbroken rings. The chain mail 11 is preferably of the type taught in U.S. Pat. Ser. No. 3,284,806 (the contents of which are incorporated herein by reference).

The rings 13 are preferably interconnected in a manner which, along with the relatively large internal diameter of each ring 13 relative to the thickness of the wire used to make such ring, makes the chain mail 11 extremely flexible. When the chain mail 11 is affixed to the flexible sheet material 12 it correspondingly folds and unfolds easily, reliably, and well during erection and retraction of convertible top 1.

The chain mail 11, and the convertible top 1 constructed therefrom, is sufficiently strong so as to resist both puncture and ripping by a hand-held tool such as a large knife. Larger and less sharp objects are also strongly restrained from ingress or egress from passenger compartment 2 through convertible top 1 and chain mail 11. For example, during violent accidents involving automobile 3 any passengers and objects within passenger compartment 2 are restrained from being forcibly ejected from automobile 3 through its convertible top 1. Meanwhile, outside objects, such as other cars, may deform the convertible top 1 and frame 4 but are resisted from penetrating convertible top 1 and directly impinging upon the passengers.

In their interconnection each of the interlocking rings 13 that is not at the borders of chain mail 11 interlocks four other rings 13. Two of these four rings pass through the central aperture of each ring 13 in a one directional sense while the remaining two rings pass through the same central aperture in the opposite directional sense. Each two rings that pass through another ring's central aperture in the same directional sense are adjacent, or paired. The resultant construction of chain mail 11 is not only geometrically regular, but is aesthetically pleasing. The polished stainless steel wire of the chain mail 11 reflects light well and appears shiny.

Figure 2:
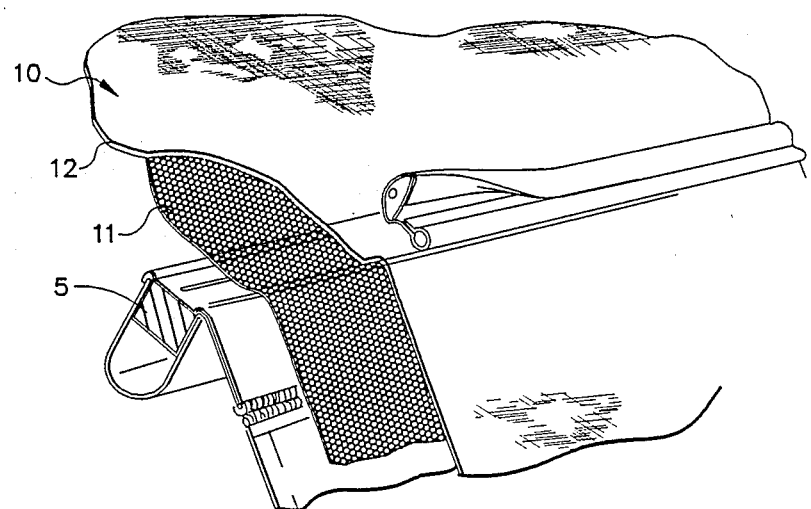
FIG. 2 is a detail perspective view, partially in cut away, showing the preferred embodiment of the chain mail used in the flexible planar material, and in the vehicular convertible top, in accordance with the present invention.
Figure 3:
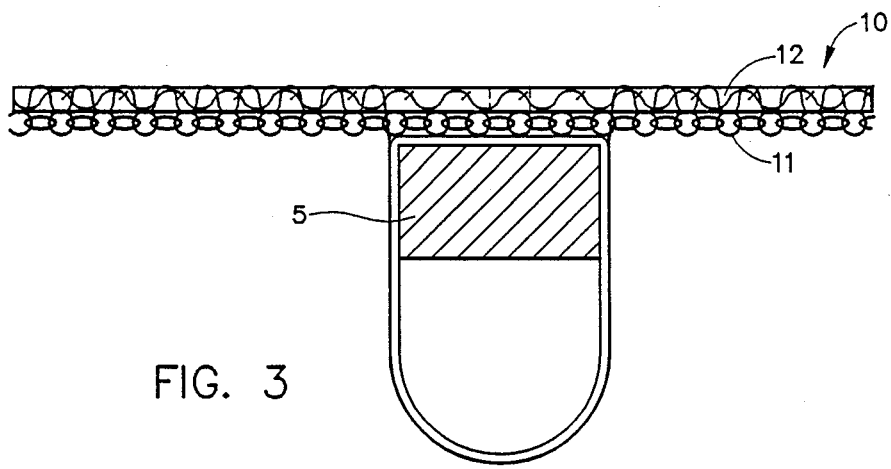
FIG. 3 is a detail side view showing the affixation of the chain mail shown in FIG. 2 to a flexible sheet material, typically fabric, in order to form a composite flexible planar material usable in vehicular convertible tops, and the affixation of the composite material to a support strut of the automotive convertible top shown in FIG. 1.

A chain mail 11 that is constructed in accordance with the preferred embodiment shown in FIGS. 2 and 3 is available from Neptumic, Inc., San Diego, Calif. 92107. The material is commonly produced for use in the construction of protective suits that are worn by divers. In order to form such diving suits the chain mail 11 is patterned into appropriate segments by the use of power cutting tools such as saws or snips. Individual broken ones of rings 13 fall away from the patterned areas, leaving all sections of chain mail 11 with smooth edges. The sections of the chain mail 11 are formed into suits that fit the contours of the human body by processes of stapling, welding, or other methods of forming seams. Individual rings 13 may be rejoined, and spot welded, in order to rejoin cut sections of the chain mail 11. In its known use for the construction of diving suits, the chain mail 11 accords resistance to puncture and tearing that is sufficient to preclude penetration by the teeth of medium size sharks. It is correspondingly useful to protect divers against sharks.

A detailed view of a strut 5 of the automotive convertible top 1 to which the composite flexible planar material 10 is affixed is shown in FIG. 3. A continuous strand, or thread, 7 passes through both the flexible planar material 12 and the chain mail 11 in order to affix them together by sewing, and also loops the strut 5. The thread 7 may be wound continuously around the strut 5 in a helical, or corkscrew, path to affix both the flexible material 12 and the chain mail 12 to strut 5 for moving therewith. Alternatively, the thread 7 may loop a strut 5, affixing the composite flexible planar material 10 thereto, over only a limited region.

Figure 6:
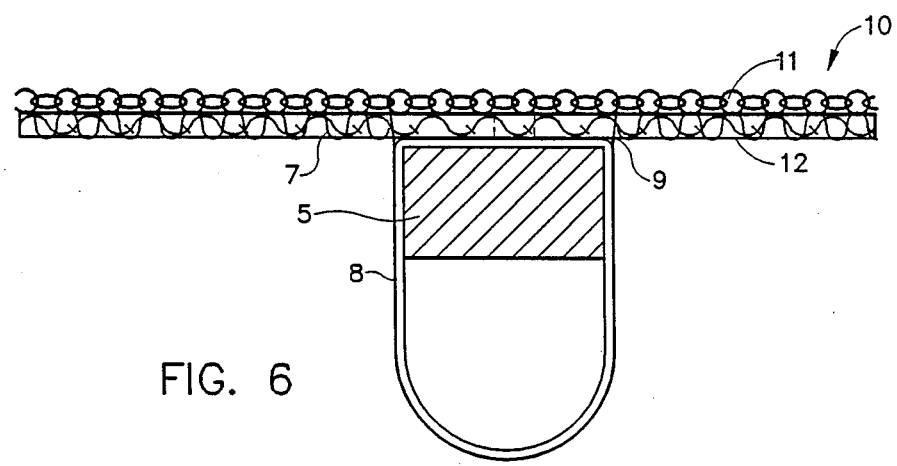
FIG. 6 is a detail side view, similar to FIG. 3, showing the composite flexible planar material affixed to a support strut of the automotive convertible top, chain mail to the exterior of the convertible top.

There exist alternative ways to connect composite flexible planar material 10 to struts 5 of the automotive convertible top 1. Instead of being directly connected to such struts by a thread 7, the composite flexible planar material 10 may be sewn, again by a thread 7, to a fabric sleeve 8 (shown in FIG. 6) that surrounds a strut 5. The connection of the composite flexible planar material 10 to such a fabric sleeve may be by sewing or gluing by glue 9 (shown in FIG. 6). The glued or sewn affixation need not be along a continuous seam. A number of regularly located points of affixation generally suffice. The strut 5 is inserted within the sleeve then holds the composite flexible planar material 10 in position as automotive convertible top 1.

When the chain mail 11 is affixed to the flexible sheet material 12 (to form composite flexible planar material 10) only by thread 7, or by other means, only at the locations of struts 5 (which are typically separated by one to two feet), then the composite flexible planar material 10 assumes a very slightly slack and very slightly drooped appearance. A convertible top 1 constructed of material so appearing substantially unlike a rigid conventional steel automotive roof or a conventional fabric convertible top. It is intended to be so. The combination of hard shiny metal and slightly muted contours is interesting and distinctive.

If, however, it is desired to affix the chain mail 11 to the flexible sheet material 12 to form a very even, tight, and homogeneous composite flexible planar material 10—almost as a laminate material that is everywhere connected to its layers—then it should be understood that this can readily be accomplished. In this case the chain mail 11 is affixed to the flexible sheet material 12, typically by extensive sewing and/or gluing, to form composite flexible planar material 10 prior to, and independently of, any potential later affixation of the composite flexible planar material 10 to the struts 5 of frame 4 of convertible top 1.

Figure 4:
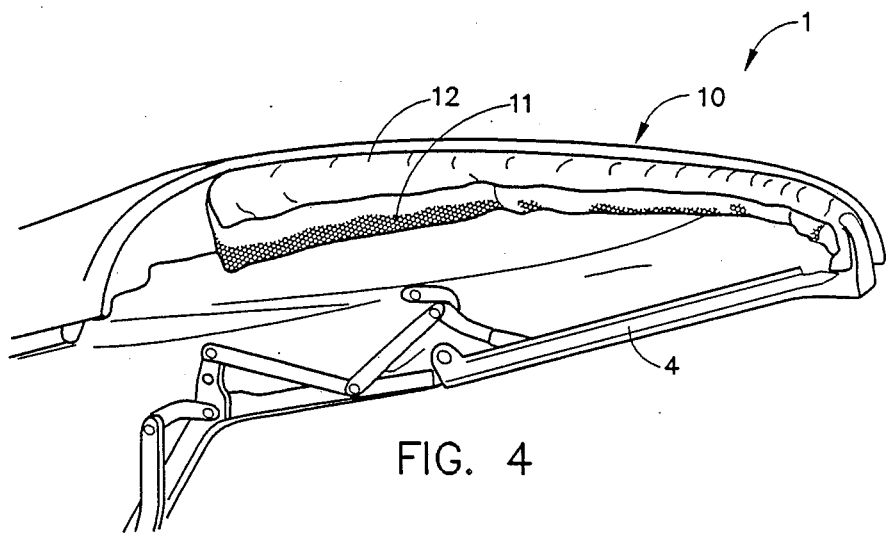
FIG. 4 is another perspective view, similar to FIG. 1, showing the automotive convertible top constructed in accordance with the present invention during the process of being fitted and trimmed.

The chain mail 11 is normally placed to the interior of flexible planar material 12 in constructing the automotive convertible top 1, as illustrated in FIGS. 2 and 4. It is alternatively possible to have the chain mail 11 positioned to the exterior of the automotive convertible top 1.

When used at the exterior of automotive convertible top 1 the chain mail 11 presents a visually interesting surface that follows the contours of the convertible top 1. The chain mail 11 is cleanable with a wide range of common cleaning agents including with detergent and water. It is durable and substantially unaffected by environmental contaminants and/or normal wear.

Particularly when used at the exterior of automotive convertible top 1, the chain mail 11 must be well formed to the contours of such top. Even when a small amount of slack is present, the chain mail 11 drapes nicely over those contours of automotive convertible top 1 that are essentially established by the patterned and joined underlying flexible fabric material 12. Such moderate looseness to the fabric material 12 as the chain mail 11 may regionally exhibit is normally not aesthetically offensive. Moderate looseness of the chain mail 11 is without any appreciate detriment to its function of providing strength to convertible top 1.

If, however, a very taut use of the chain mail 11 within the automotive convertible top 1 is desired, such tautness can be obtained by two means. First, the number of affixation points between the chain mail 11 and the underlying flexible fabric material 12 can be increased. At the ultimate, most or even all rings of the chain mail 11 can be glued or sewn to the flexible fabric material 12. Alternatively, slack regions of the chain mail can be pulled together by the inconspicuous removal of rings and the rejoining of remaining sections, or by the use of small loops of stainless steel wire to thread, and to pull together, a number of the rings 13 within a certain region of the chain mail 11. Even when the chain mail 11 is highly taut within composite flexible planar material 11, and within convertible top 1, it flexes and folds easily and well.

The same characteristics of the chain mail 11 that permit of its ready tailorability in the construction of an automotive convertible top 1 also permit that the chain mail 11 should be repaired if necessary. Particularly, if any of the rings 13 break, or are damaged, then they may be individually replaced. The minor spot welding that transpires during the rejoining of the rings 13 is normally not injurious to adjacent regions of the flexible planar material 12. Alternatively, large segments of the chain mail 11 that are severely damaged may be cut out and patched. If the patching is of the identical number of ring 13 that are removed then patched and repaired chain mail 11 is substantially identical to the original.

The fitting and trimming of the automotive convertible top 1 is illustrated in FIG. 4. When the top 1 is initially fitted over frame 4 (and its struts 5, not shown) then excess lengths of the composite material is extended beyond the regions where the finished borders of the top 1 will be created. This excess material is trimmed with strong scissors or a nibbling tool. The highly flexible nature of the composite material 10 permits that it may be folded back on itself to make necessary seams and flanges in a manner entirely similar to the construction of a normal automotive convertible top.

The chain mail 11 of the automotive convertible top 1 may be electrically isolated from the ground of automobile 3, and its frame 4, by a layer of flexible planar material 12. An alarm indicator (not shown) such as a bell or buzzer may be connected between the primary voltage supply of automobile 3, normally +12 v.d.c. from the battery, and the chain mail 11. If the chain mail 11 is punctured or otherwise deformed during forced entry into the passenger compartment 2 of automobile 3, it is probable that the chain mail will become grounded by contact with metal portions of automobile 3, such as its frame 4. Upon such an occurrence, the alarm will sound serving as a further deterrent to forced entry into the automobile's interior.

In accordance with the preceding discussion, certain alternative embodiments of the present invention will suggest themselves to practitioners of the arts of composite materials fabrication and automotive design. For example, the chain mail 11 could be used exclusively, and without any accompanying flexible sheet material 12, in the creation of an automotive convertible top 1. Although such top would not appreciably protect the vehicle's interior from weather, it might be considered to provide an elegant and unique vehicular roof. Such a roof would permit the passage of sunlight and fresh air while physically protecting the occupants of the vehicle and lightly shading them from direct view. For example, the composite flexible planar material 10 in accordance with the present invention need not be exclusively used in full scale automotive convertible tops, but could be usefully employed in sliding sunroofs, side curtains, wind flaps, or other structures used for enclosing and protecting vehicles.

In accordance with these and other obvious adaptations and alterations of the present invention, the invention should be interpreted in accordance with the language of the following claims, only, and not solely in accordance with those preferred embodiments within which the invention has been taught.

What is claimed is:

1. In a vehicular convertible top having
   a support frame including support members that are moveable between a lowered position exposing the interior of the vehicle and a raised position over the interior of the vehicle; and
   a flexible planar material, affixed to the support frame for moving therewith, for shielding the interior of the vehicle in the raised position of the support members, an improvement comprising:
   chain mail, substantially coextensive with the flexible planar material and affixed to the support frame for moving therewith, for resisting forceful penetration of objects between the exterior and interior of the vehicle through the flexible planar material; and
   first affixation means for affixing the chain mail to the support frame.

2. The vehicular convertible top improvement according to claim 1 wherein the chain mail is on an opposite side of the flexible planar material from the support frame and vehicular interior, and thereby resists forceful penetration of objects from the exterior of the vehicle through the flexible planar material.

3. The vehicular convertible top improvement according to claim 1 wherein the chain mail is disposed between the flexible planar material and the vehicular interior, and thereby resists forceful penetration of objects from the interior of the vehicle to the exterior of the vehicle through the flexible planar material.

4. The vehicular convertible top improvement according to claim 1 wherein the first affixation means comprises:
threading means for passing through interstitial spaces of the chain mail and looping around the support frame so as to fixedly tie the chain mail to the support frame.

5. The vehicular convertible top improvement according to claim 4 further comprising:
second affixation means for affixing the chain mail to the flexible planar material.

6. The vehicular convertible top improvement according to claim 5 wherein the second affixation means comprises:
sewing means for affixing the chain mail to the flexible planar material by sewing.

7. The vehicular convertible top improvement according to claim 6 wherein the threading means comprises:
a first thread; wherein the sewing means comprises:
a second thread; and
wherein the threading means operates in conjunct with the sewing means so that the tying of the chain mail to the support frame is by the first thread connecting to the second thread in order to serve to sew the chain mail to the flexible planar material so that the chin mail, the flexible planar material, and the support frame are fixed collectively together.

8. The vehicular convertible top improvement according to claim 6 wherein the sewing means for affixing the chain mail to the flexible planar material operates substantially independently of the threading means for affixing the chain mail to the support frame, meaning that although the chain mail is affixed to both the flexible planar material and the support frame it is not so affixed at the same point by a single means that accomplishes both sewing and tying.

\* \* \* \* \*